US010442364B2

(12) United States Patent
Detweiler et al.

(10) Patent No.: US 10,442,364 B2
(45) Date of Patent: *Oct. 15, 2019

(54) ADJUSTABLE ANCHOR ON A LOAD CARRIER FOR A BICYCLE THROUGH-AXLE

(71) Applicant: Thule Sweden AB, Hillerstorp (SE)

(72) Inventors: James Detweiler, Bristol, CT (US); Joseph Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,113

(22) Filed: Sep. 21, 2018

(65) Prior Publication Data
US 2019/0016272 A1 Jan. 17, 2019

Related U.S. Application Data

(63) Continuation of application No. 14/807,771, filed on Jul. 23, 2015, now Pat. No. 10,112,547.

(60) Provisional application No. 62/033,619, filed on Aug. 5, 2014, provisional application No. 62/029,298, filed on Jul. 25, 2014.

(51) Int. Cl.
B60R 9/10 (2006.01)
B60R 9/048 (2006.01)
B60R 9/058 (2006.01)
F16B 2/14 (2006.01)
F16B 2/18 (2006.01)

(52) U.S. Cl.
CPC ............... B60R 9/10 (2013.01); B60R 9/048 (2013.01); B60R 9/058 (2013.01); F16B 2/14 (2013.01); F16B 2/18 (2013.01); F16B 2/185 (2013.01)

(58) Field of Classification Search
CPC . B60R 9/10; B60R 9/058; B60R 9/048; F16B 2/18; F16B 2/14; F16B 2/185
See application file for complete search history.

(56) References Cited

U.S. PATENT DOCUMENTS

| 3,270,994 A | 9/1966 | Machan |
| 4,629,104 A | 12/1986 | Jacquet |
| 5,419,479 A | 5/1995 | Evels et al. |
| 5,492,258 A | 2/1996 | Brunner |

(Continued)

FOREIGN PATENT DOCUMENTS

WO    WO 2015012952 A1    1/2015

OTHER PUBLICATIONS

European Search Report for European Application No. EP 15173782. 2, European Patent Office, Munich, Germany, dated Dec. 8, 2015, 6 pages.

Primary Examiner — Stanton L Krycinski
(74) Attorney, Agent, or Firm — Sterne, Kessler, Goldstein & Fox, P.L.L.C.

(57) ABSTRACT

An anchor for releasably securing a bicycle through-axle that is installed in a wheelless front fork of a bicycle to a load carrier. The anchor is made up of an anchor body having a through-axle receiving space for receiving a bicycle through-axle therein. The anchor additionally has a movable jaw located within the anchor body and that is transitionable between a receiving configuration in which an interior of the receiving space is expanded for insertably receiving a bicycle through-axle therein, and a securing configuration in which the movable jaw is in lateral abutting engagement with a bicycle through-axle received within the interior of the receiving space.

21 Claims, 10 Drawing Sheets

(56) References Cited

U.S. PATENT DOCUMENTS

| | | |
|---|---|---|
| 5,730,343 A | 3/1998 | Settelmayer |
| 5,845,828 A | 12/1998 | Settelmayer |
| 6,167,735 B1 | 1/2001 | Brown |
| 6,575,344 B2 | 6/2003 | Nusbaum |
| 6,918,521 B2 | 7/2005 | Settelmayer et al. |
| 7,040,609 B1 | 5/2006 | Liou |
| 7,566,038 B2 | 7/2009 | Scott et al. |
| 8,177,209 B2 | 5/2012 | Chen |
| 8,196,789 B2 | 6/2012 | Kraeuter et al. |
| 8,393,507 B2 | 3/2013 | Aftanas |
| 8,496,145 B2 | 6/2013 | Sautter et al. |
| 9,168,641 B2 | 10/2015 | Chen |
| 9,328,751 B1 | 5/2016 | Liu |
| 9,376,065 B2 | 6/2016 | Budd et al. |
| 9,381,866 B2 | 7/2016 | Sautter et al. |
| 9,598,023 B2 | 3/2017 | Kisaka et al. |
| 2003/0080267 A1 | 5/2003 | Eslick |
| 2007/0012738 A1 | 1/2007 | Grim |
| 2008/0061198 A1 | 3/2008 | Noyes |
| 2010/0147914 A1 | 6/2010 | Sautter et al. |
| 2011/0132946 A1 | 6/2011 | Sautter et al. |
| 2011/0139841 A1 | 6/2011 | Sautter et al. |
| 2014/0203550 A1 | 7/2014 | Utsch |
| 2016/0039355 A1 | 2/2016 | Settelmayer |

ADJUSTABLE ANCHOR ON A LOAD CARRIER FOR A BICYCLE THROUGH-AXLE

CROSS REFERENCE TO RELATED APPLICATIONS

This application is a continuation of U.S. application Ser. No. 14/807,771, filed Jul. 23, 2015, which claims priority to U.S. Provisional Application No. 62/033,619, filed Aug. 5, 2014, and claims priority to U.S. Provisional Application No. 62/029,298, filed Jul. 25, 2014, the disclosures of which are hereby incorporated by reference in their entireties.

BACKGROUND

The releasable engagement of front tires to bicycles using skewers is well-known. Certain designs for bicycle forks, however, have necessitated that the axle upon which the front wheel of the bicycle rotates be fortified. Examples include mountain bikes and other types of bicycles designed to withstand substantial shock forces in the fork which could damage a conventional skewer. Therefore, the through-axle design has been developed for these fortified forks. The through-axle comprises a solid round bar or hollow tube that is received in sleeves, typically at the lower ends of the two legs of the fork, and constituting a hub. Typical sizes of the through-axle are 10 mm, 15 mm and 20 mm installed on hubs that can range in widths from 100 mm to 160 mm.

Vehicular load carriers for bicycles, in at least one type of design, have typically incorporated an anchor in which the skewer that normally secures the front wheel to the bicycle fork is instead used to secure the fork to an anchor that is either positioned upon the load carrier or is made as an integral part of the load carrier. The utilization of through-axle connectors to the forks has thus necessitated a new design for such anchors.

BRIEF DESCRIPTION OF THE DRAWINGS

Implementations of the present application will now be described, by way of example only, with reference to the attached figures, wherein.

DETAILED DESCRIPTION

Figure 1:
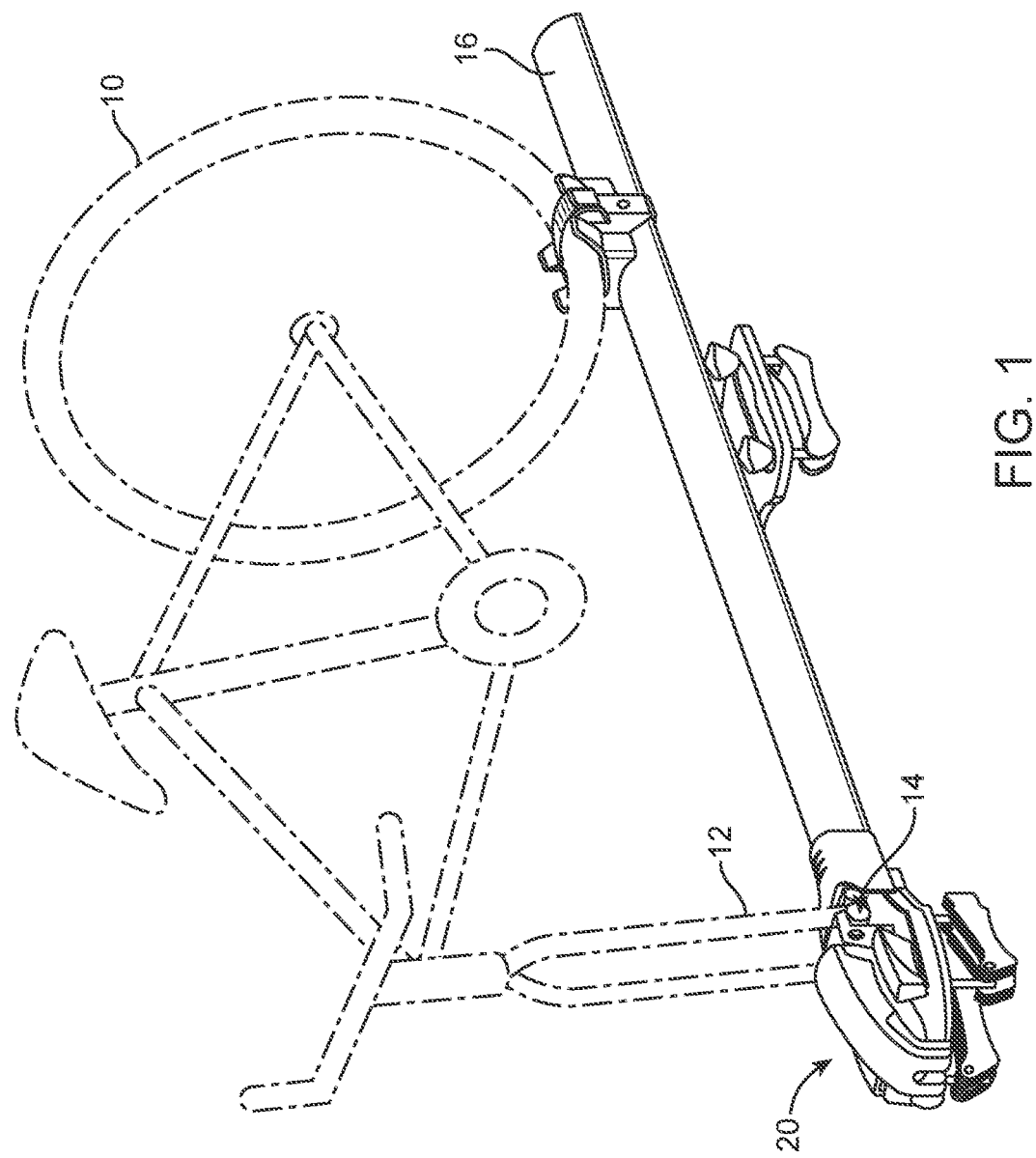
FIG. 1 illustrates a perspective view of one embodiment of a roof mounted bicycle carrier with an anchor.

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations and embodiments described herein.

The present disclosure concerns various components that can be implemented and utilized to anchor or secure bicycle wheels of different sizes onto load carriers. Load carriers can include, but are not limited to, load carriers which are mountable onto vehicles such as cars and trucks. At least one way that bicycles can vary in size is that their tires can vary in width and diameter. While the illustrated examples are provided in relation to a bicycle wheel anchor, certain components can be implemented with other devices.

The present disclosure relates to an anchor for releasably securing to a carrier, a bicycle through-axle that is installed in a wheelless front fork of a bicycle. An anchor can include an anchor body which has a through-axle receiving space for receiving a bicycle through-axle therein. An anchor can also include a movable wedge located within the anchor body which is transitionable between a receiving configuration, in which an interior of the receiving space is expanded for insertably receiving a bicycle through-axle therein, and a securing configuration, in which the movable wedge can be in abutting engagement with a bicycle through-axle received within the interior of the receiving space.

In at least one embodiment, the movable wedge approaches the bicycle through-axle received within the interior of the receiving space from the side of the interior space, in a substantially horizontal direction, and thereby affects lateral abutting engagement of the movable wedge on the bicycle through-axle. The anchor can further include a through-axle receiving space having a variably configurable interior for receiving different sized bicycle through-axles therein. In at least one embodiment the movable wedge approaches the through-axle in a direction toward the load carrier. In at least one embodiment the movable wedge approaches the through-axle in a direction away from the load carrier.

The anchor can further include an adjuster located within the anchor body and positioned near to the through-axle receiving space.

The anchor can further include a buttress located within the anchor body and positioned adjacent to the through-axle receiving space, the buttress including a mating portion that fits about differently sized bicycle through-axles when abuttingly engaged thereagainst. Additionally, the anchor can include an actuator coupled to the movable wedge that transitions the movable wedge between the receiving and securing configurations and wherein the through-axle receiving space laterally bounds a bicycle through-axle inserted therein when the movable wedge is in the securing configuration.

The anchor can also include an adjuster located within the anchor body and variably adjustable for controlling a press-force exerted on a bicycle through-axle in the securing configuration. The adjuster can be coupled to the actuator and configured such that rotation of the adjuster about an axis of the actuator causes the actuator to rotate. In at least one embodiment, the adjuster can be variably adjustable for adjusting the distance of the movable wedge from the buttress when the movable wedge is in the through-axle receiving configuration. In at least one embodiment, the adjuster can be variably configurable for varying the size of the interior of the through-axle receiving space. In at least one embodiment, the adjuster can be a threaded turnbuckle for adjusting an effective length of an extension rod of the actuator. In at least one embodiment, the adjuster can be a thumb wheel for rotating an extension rod of the actuator and causing a threaded end of the extension rod to translate relative to the movable wedge.

In at least one embodiment, the actuator can have a lever coupled to the movable wedge that translates the movable wedge between the receiving and securing configurations. The lever can form a cover over the through-axle receiving space in a fully actuated configuration of the lever and/or over the movable wedge when the wedge is in a securing configuration.

In at least one embodiment, the anchor can include a lock that releasably secures the lever over the through-axle receiving space in the fully actuated configuration the second lever and/or over the movable wedge when the wedge is in a securing configuration.

In at least one embodiment, the lever can be journaled to the anchor body at a first end of the lever. In at least one embodiment, the actuator can be coupled to the movable wedge and configured to linearly translate the movable wedge slidingly across a support surface of the anchor body between the receiving and securing configurations. The actuator can also include a biasing member configured to act upon the lever and configured to retract the movable wedge toward the receiving configuration from the securing configuration. As indicated above, the actuator can include a lever which can form a cover over the through-axle receiving space in a fully actuated configuration of the lever when the lever is in a downward position with respect to the anchor body.

In at least one embodiment, the lever can be coupled to the movable wedge and can be configured to adjust the position of the wedge and the amount of force imparted by the lever and wedge for securing a through-axle within the anchor and securing the bicycle to a load carrier. In at least one embodiment, the securing and releasing action of the lever can occur in a horizontal plane formed by a length of the load carrier.

In at least one embodiment, the lever, being coupled to the movable wedge, can be configured to pivotably translate the wedge between the receiving and securing configurations.

In at least one embodiment of the anchor, the movable wedge can be configured to approach a bicycle through-axle received within the interior of the receiving space from a side of through-axle, in a substantially horizontal direction, thereby affecting lateral abutting engagement of the movable wedge on the bicycle through-axle. In at least one embodiment, the through-axle receiving space can have a variably configurable interior for receiving different sized bicycle through-axles therein.

In at least one embodiment, the anchor can also include a buttress located within the anchor body which is positioned adjacent or near to the through-axle receiving space. The buttress can include a mating portion configured and shaped to fit about differently sized bicycle through-axles when abuttingly engaged with the through-axle.

In at least one embodiment, the anchor can include an actuator which is coupled to the movable wedge and configured to transition the movable wedge between the receiving and securing configurations. The through-axle receiving space can laterally bound a bicycle through-axle inserted therein when the movable wedge is in the securing configuration.

In at least one embodiment, the actuator can be operationally linked to an adjuster located within the anchor body. The adjustor can be variably adjustable for controlling or adjusting a press-force exerted on a bicycle through-axle in the securing configuration. Alternatively or additionally, the adjuster can be variably configurable and/or adjustable for varying the size of the interior of the through-axle receiving space when the wedge is in a through-axle receiving configuration.

In at least one embodiment, the actuator of the anchor can be configured to linearly translate the movable wedge slidingly across a support surface of the anchor body between the receiving and securing configurations in response to a rotational movement of the lever about an axis substantially normal to the load carrier.

In at least one embodiment, the actuator can comprise a biasing member acting upon a lever which is coupled to the movable wedge and which is configured to urge the movable wedge into the receiving configuration from the securing configuration. The biasing member can be a coil spring or an element of stressed material, such as, but not limited to, aluminum or steel. In at least one embodiment of the anchor, the anchor body can be at least partially disassembled, enabling components such as the lever, the adjuster, the actuator and the biasing member to be removed for replacement or repair.

In at least one embodiment, first end of the actuator can include a cam surface configured to urge the movable wedge toward the receiving configuration when the lever is rotated away from the movable wedge and from a substantially orthogonal position with respect an axis formed by the load carrier. Alternatively or additionally, in at least one embodiment, the cam surface can configured to urge the movable wedge toward the securing configuration when the lever is rotated toward the movable wedge and away from a substantially orthogonal position with respect to the axis of the load carrier.

In at least one embodiment, a bicycle through-axle engagement profile on the movable wedge can be substantially slanted with respect to the anchor body for abuttingly engaging differently sized bicycle through-axles. The through-axle engagement profile on the movable wedge can be substantially slanted in a direction away from the receiving space. That is, an edge of the wedge closer to the anchor body can be a greater distance from the load carrier than an edge which is closer to the load carrier. Put another way, the lower portion of the wedge can be wider than the upper portion of the wedge along the axis formed by the load carrier.

In at least one embodiment, a bicycle through-axle engagement profile of the movable wedge can be substantially slanted in a direction toward the receiving space for abuttingly engaging differently sized bicycle through-axles. That is, an edge of the wedge which is farther away from a lower portion of the anchor can be farther away from the load carrier than an edge of the wedge which is closer a lower portion of the anchor body. Put another way, the upper portion of the wedge can be wider than the lower portion of the wedge along the axis formed by the load carrier.

In at least one embodiment, a bicycle through-axle engagement profile on the buttress can be substantially L-shaped, and more particularly, an inverted L-shape for abuttingly engaging differently sized bicycle through-axles.

In at least one embodiment, the inclining/declining of the movable wedge can be at least partially curved or fully curved. The curved surface of the wedge can be at least partially concave with respect to the buttress.

In at least one embodiment, the buttress can have an overhanging portion which is substantially parallel to the anchor body and the axis of the load carrier. In at least one embodiment, the overhanging buttress can be at least partially slanted with respect to the wedge. In at least one embodiment, a portion of a profile of the overhanging portion of the wedge can be configured to at least partially overlap with a profile of the wedge, viewed from the side of the anchor body or the viewed from above the anchor body, or both.

FIG. 1 illustrates a bicycle 10 mounted to a load carrier 16 by an anchor 20 configured for releasably securing the bicycle through-axle 14 that is installed in the wheelless front fork 12 of the bicycle.

Figure 2:
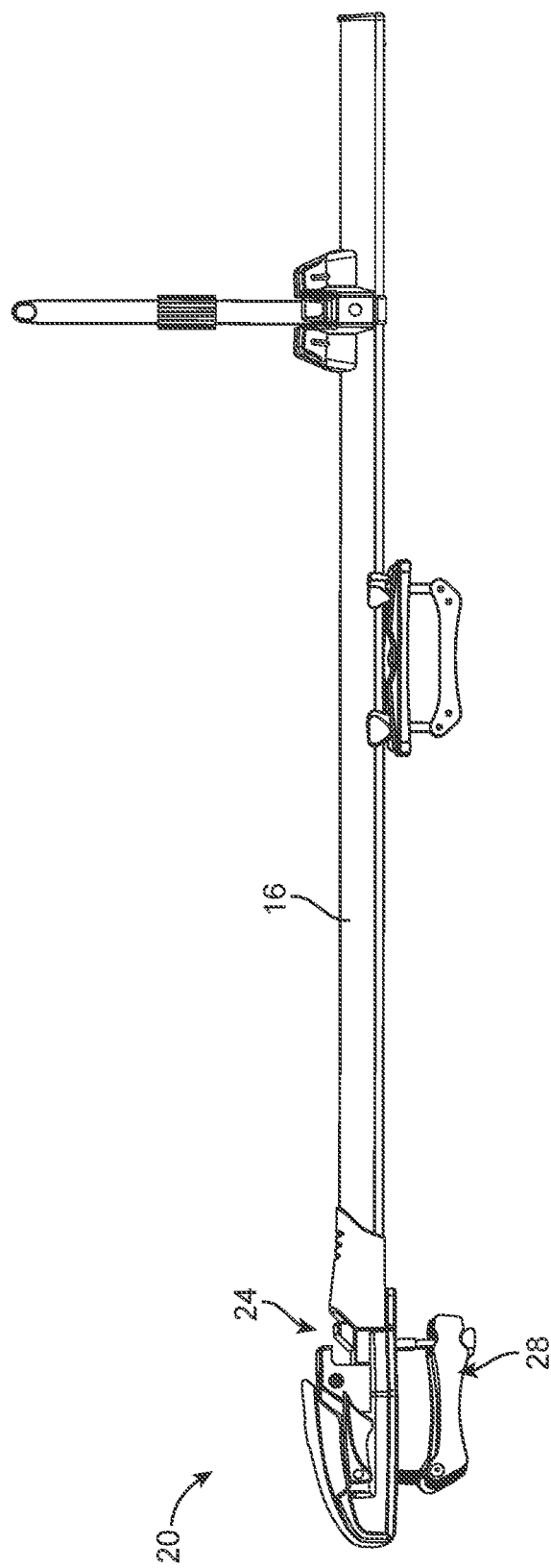
FIG. 2 illustrates a side view of one embodiment of a roof mounted bicycle carrier with an anchor.

FIG. 2 illustrates the same load carrier 16 having an anchor 20 without a bicycle installed therein. As shown, the anchor 20 includes a through-axle receiving space 24 for receiving a bicycle through-axle therein, as well as brackets 28 for attaching the load carrier to a load bar such as a vehicle cross-bar.

Figure 3:
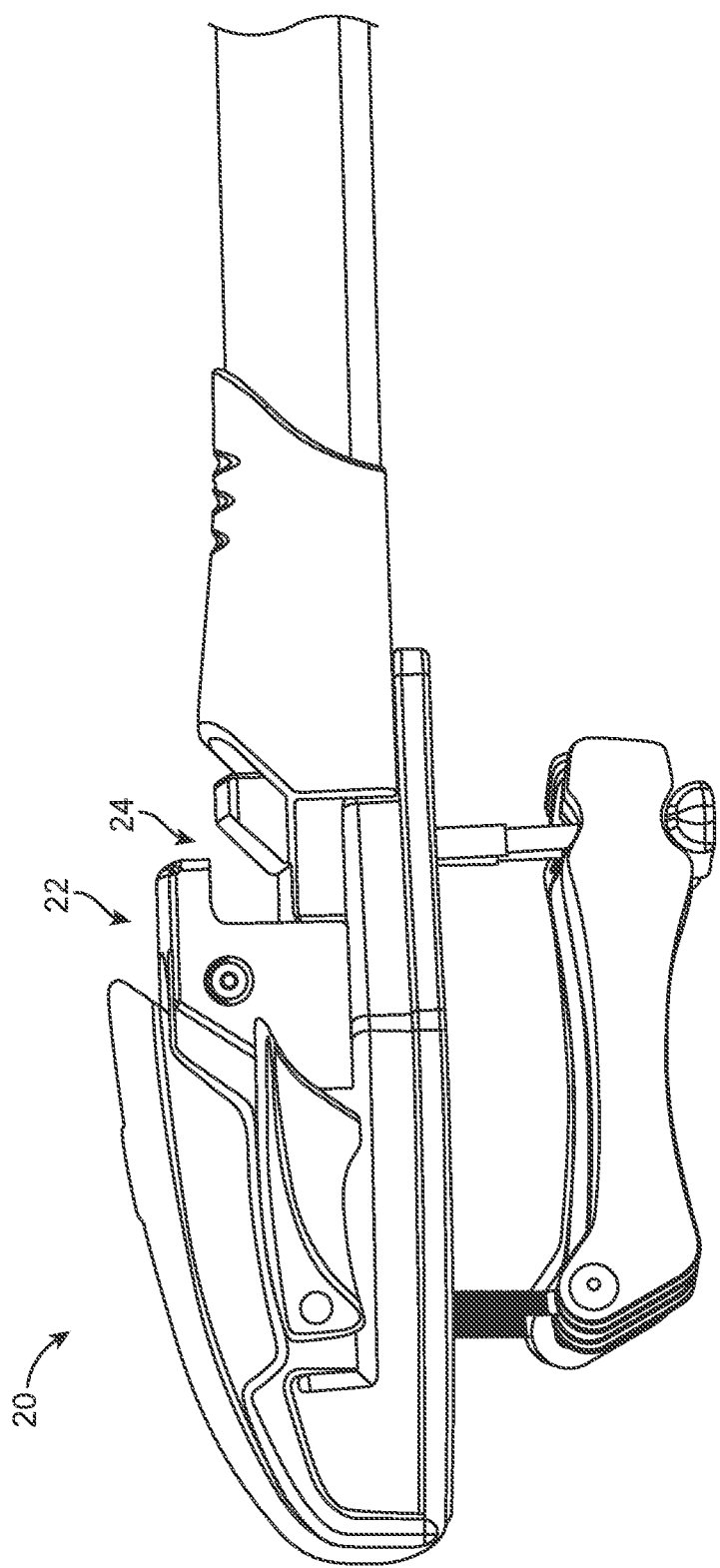
FIG. 3 illustrates a side view of one embodiment of an anchor.

FIG. 3 illustrates an embodiment of an anchor 20. The anchor 20 comprises (includes, but is not limited to) an anchor body 22 comprising a through-axle receiving space 24 for receiving a bicycle through-axle therein.

Figure 4:
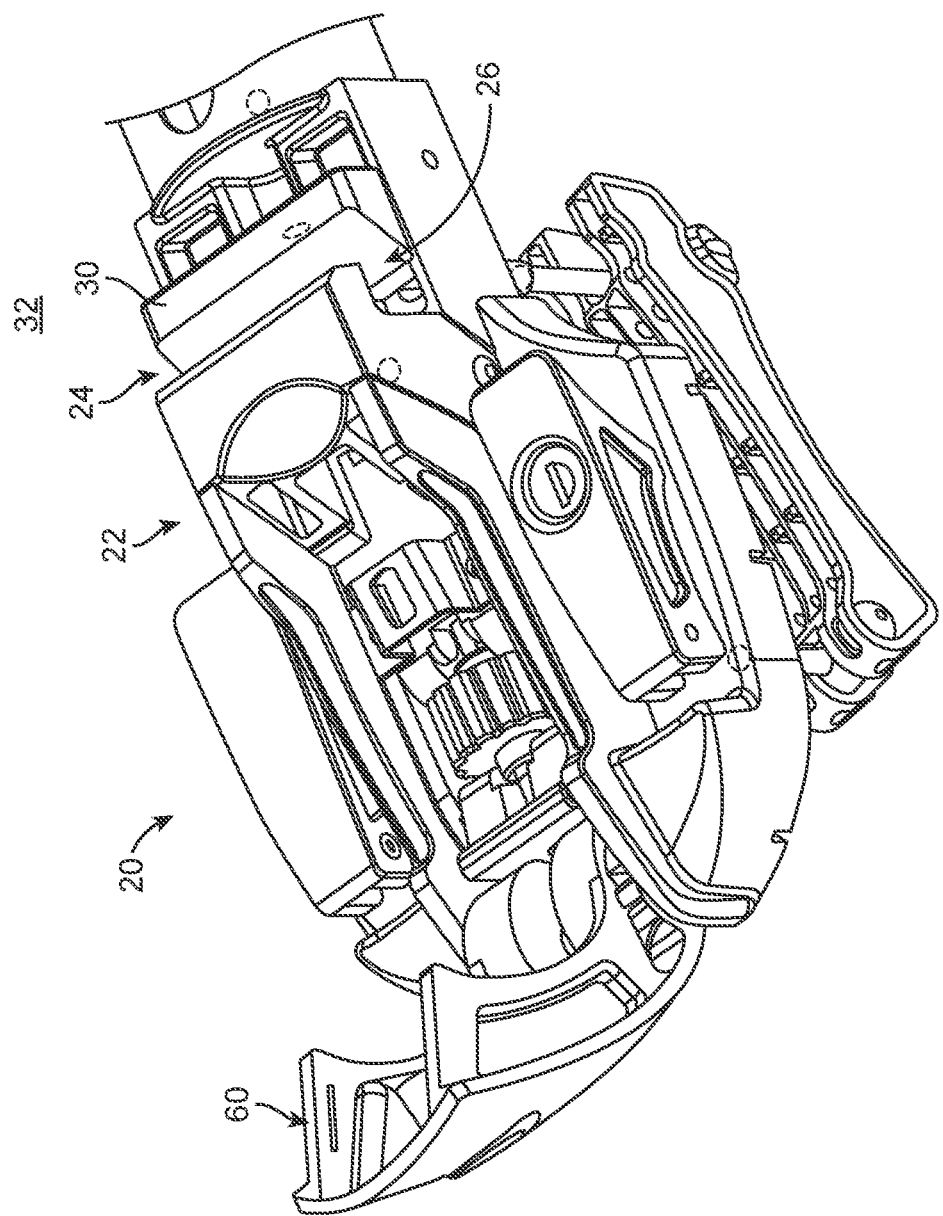
FIG. 4 illustrates a perspective view of one embodiment of an anchor with a movable wedge positioned in a receiving configuration.

FIG. 4 illustrates one example of the anchor 20 with a lever of the anchor 20 raised to show internal components. Shown is a movable wedge 30 located within the anchor body 22, which is transitionable between a receiving configuration and a securing configuration. The movable wedge 30 is positioned in a receiving configuration 32 in which an interior 26 of the receiving space 24 is expanded for insertably receiving a bicycle through-axle 14 (not shown) therein.

Figure 5:
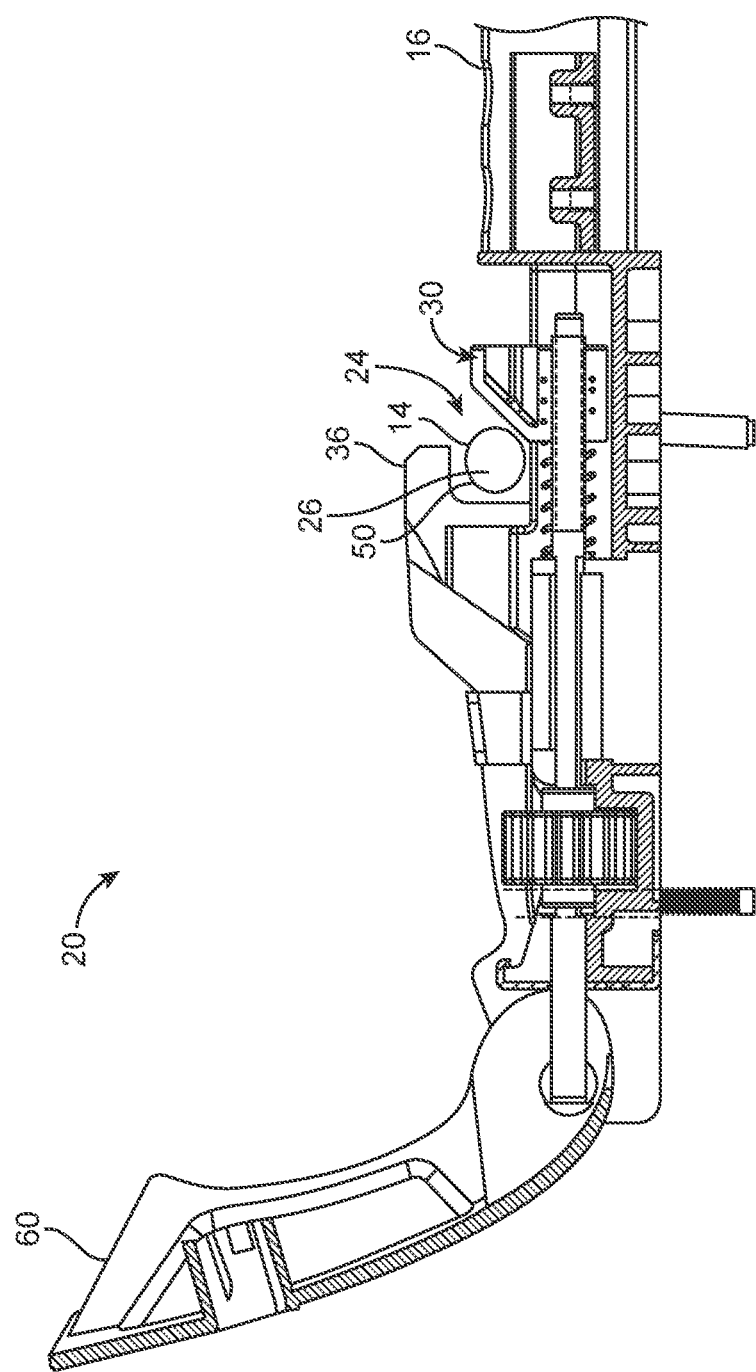
FIG. 5 illustrates a side view of one embodiment of an anchor with a movable wedge positioned in a receiving configuration.

FIG. 5 illustrates anchor 20 in a receiving configuration 32 in which the movable wedge 30 is moved away from lateral abutting engagement with the bicycle through-axle 14 received within the interior 26 of the receiving space 24. That is, in the receiving configuration, the movable wedge 30 is moved in a direction away from a buttress 36 and toward the load carrier 16. As illustrated, the buttress 36 can be located within the anchor body 22 and positioned adjacent to the through-axle receiving space 24. The buttress 36 can have a mating portion 50 that fits about differently sized bicycle through-axles when abuttingly engaged with such through axles.

As indicated above, in at least one embodiment, the through-axle receiving space 24 has a variably configurable interior 26 for receiving different sized bicycle through-axles 14 therein. By variably configurable, it is meant that the interior 26 of the receiving space 24 can be made to have at least different sizes, and potentially other dimensions as well, in the receiving configuration 32. The particular size and/or configuration of the interior 26 of the receiving space 24 depends upon the size (and shape) of the through-axle 14 intended to be installed therein for securement.

Figure 6:
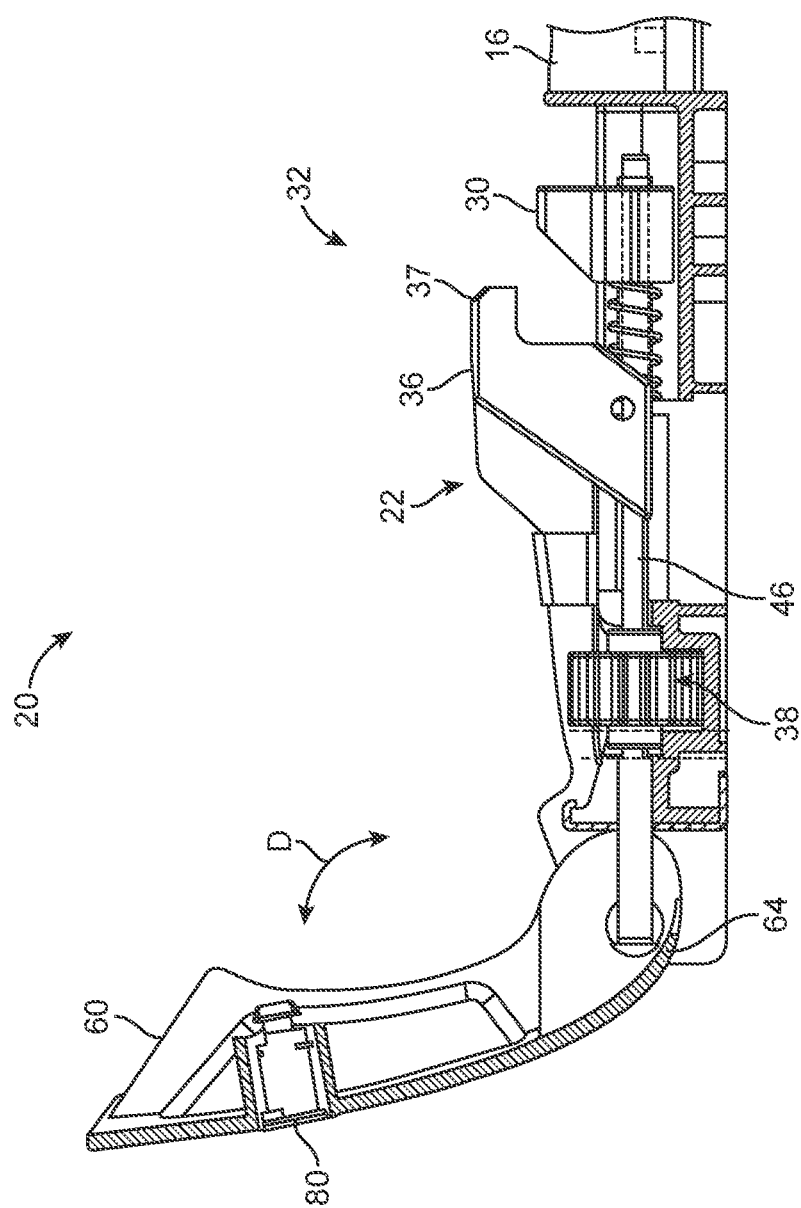
FIG. 6 illustrates a side view of another embodiment of an anchor with a movable wedge positioned in a receiving configuration.

FIG. 6 illustrates anchor 20 in a receiving configuration 32 in which the movable wedge 30 is moved away from buttress 36 and toward the load carrier 16. As indicated with reference to FIG. 5, the buttress 36 can be located within the anchor body 22 and positioned adjacent to the through-axle receiving space 24. As shown, the anchor body can include an actuator 46 coupled to the movable wedge 30 and coupled to a lever 60. The lever 60 can be configured such that rotation of the lever 60 in direction D can cause the actuator to translate within the anchor body 22, thereby causing the movable wedge to also translate toward and away from the anchor body 22 and buttress 36. As shown, the buttress 36 can have an overhanging portion 37 which extends from the buttress 36 in a direction toward the wedge 30. Also illustrated within the anchor body 22 is an adjuster 38. The adjuster can be used to adjust the distance of the wedge 30 from the buttress 36 when the wedge 30 is in a through-axle receiving configuration. The adjuster 38 can include threads or ridges in the interior of the adjuster 38 which are configured to interact with threads or ridges on an exterior of the actuator. In at least one embodiment, rotation of the adjuster 38 can adjust the position of the wedge 30 when the wedge is in the through-axle receiving configuration 32. Such adjustment can also have the effect of adjusting the force imparted by the wedge 30 against a through axle 14 by adjusting the relative distance between a first end 64 of the lever 60 and the wedge 30. That is adjuster 48 can be variably adjustable for controlling a press-force exerted on a bicycle through-axle 14 in the securing configuration.

Referring to FIG. 6, a first configuration of the adjuster 38 takes the form of a thumbwheel by which rotation is imparted to the actuator rod 46. When the rod 46 is threaded at the right end, and the interior of the wedge 30 that receives the rod 46 is also threaded, rotation of the thumbwheel 38 translates the wedge 30 on the rod 46 between the securing and releasing configurations. In a second configuration, the manually engageable wheel 38 acts as a turnbuckle. In this configuration, the two rods connected to the wheel 38 are oppositely threadedly connected to the wheel 38 and fixed against rotation, typically by using splined connections or key/keyway arrangements, so that rotation of the wheel in one direction draws the two connected rods together and rotation of the wheel in the opposite direction extends the two connected rods away from one another. In this way, the wedge 30 is also moved back and forth depending on whether the effective length of the two rods connected by the turnbuckle is being constricted or extended.

As described, the actuator 46 can be coupled to (interconnected with, but not necessarily directly) the movable wedge 30 for transitioning the movable wedge 30 between the receiving 32 and securing 34 configurations. The through-axle receiving space 24 laterally bounds any bicycle through-axle 14 inserted therein when the movable wedge 30 is in the securing configuration 34. By "laterally bound" it is meant that sidewalls of the receiving space 24 are at least as tall as the through-axle 14 received therein in both the receiving 32 and securing 34 configurations. It is possible, however, that the receiving space 24 can be open above the received through-axle 14.

Figure 7:
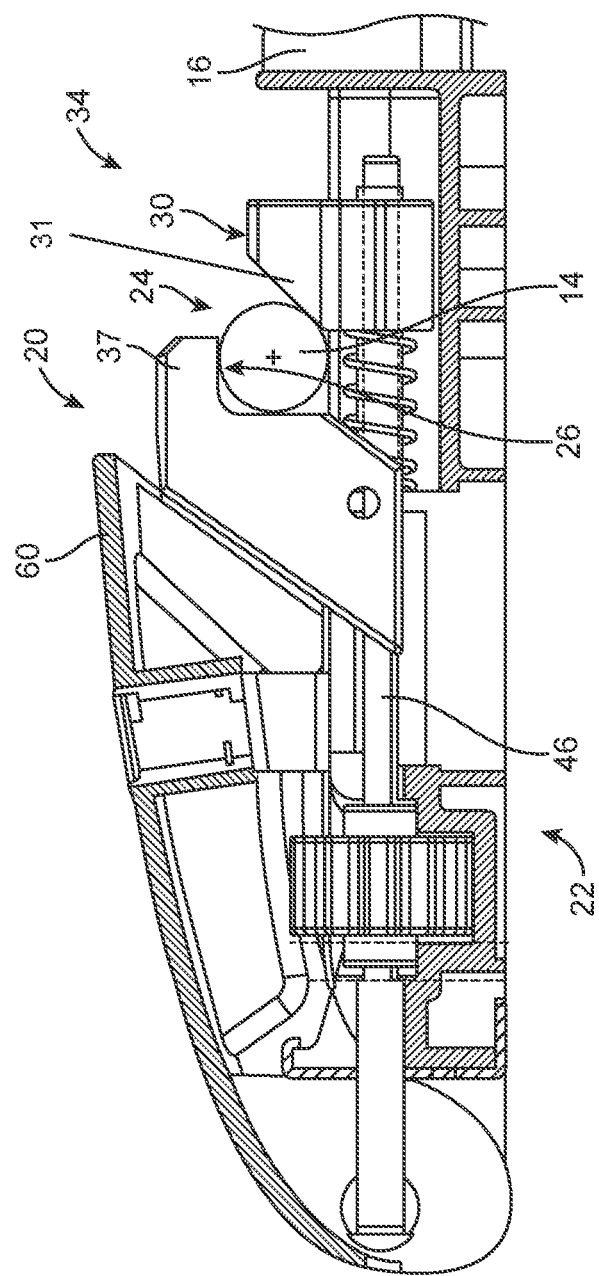
FIG. 7 illustrates a side view of an embodiment of an anchor with a movable wedge positioned in a securing configuration.

FIG. 7 illustrates anchor 20 in a securing configuration 34 in which the movable wedge 30 is in lateral abutting engagement with the bicycle through-axle 14 received within the interior 26 of the receiving space 24. By lateral abutting engagement it is meant that the movable wedge 30 approaches the through-axle 14 from its side when transitioning from the receiving configuration 32 to the securing configuration 34 and ultimately presses against the through-axle 14 for trapping the through-axle 14 in the interior 26 of the receiving space 24. That is, the movable wedge 30 approaches the bicycle through-axle 14 received within the interior 26 of the receiving space 24 from its side, in a substantially horizontal direction parallel to the load carrier, and thereby affects lateral abutting engagement of the movable wedge 30 on the bicycle through-axle 14. The wedge 30 is moved toward the securing configuration 34 by translational movement of actuator 46 imparted by a downward motion of the lever 60 toward the anchor body 22.

Figure 8:
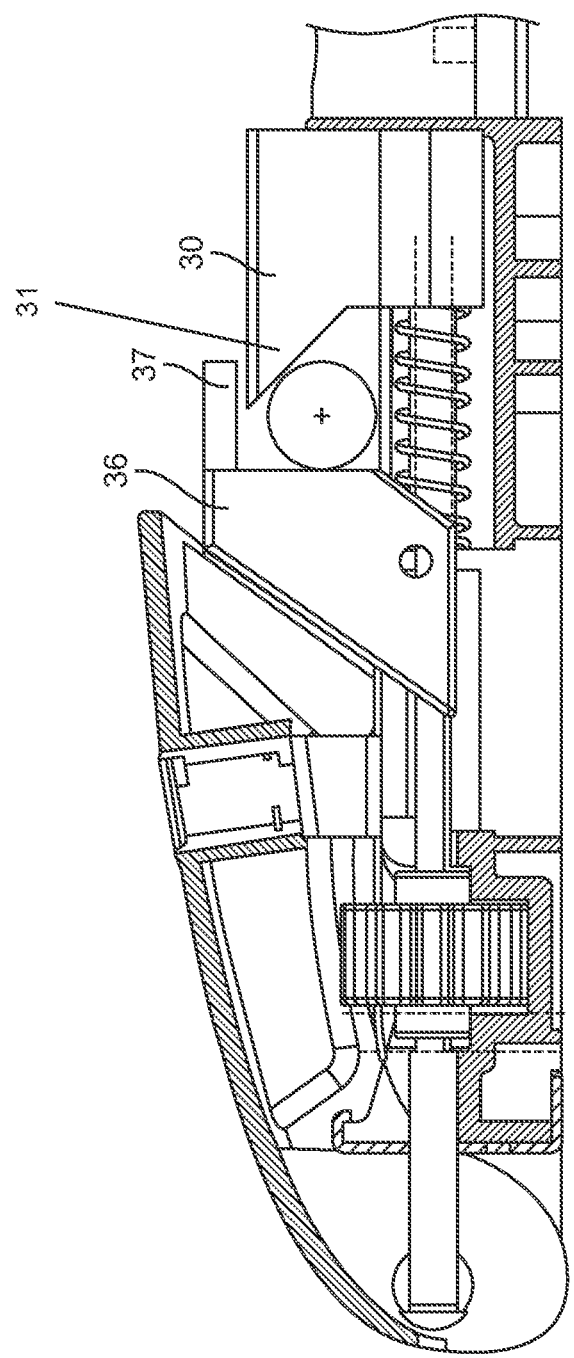
FIG. 8 illustrates a side view of another embodiment of an anchor with a movable wedge positioned in a securing configuration.

FIG. 8 illustrates another embodiment of the wedge 30 and another embodiment of the buttress 36. It will be understood that these embodiments can be used in place of the corresponding embodiments illustrated in the preceding figures. In FIG. 8, overhanging portion 37 of buttress 36 partially overlaps with a portion of wedge 30. Wedge 30 in FIG. 8 is slanted toward buttress 36, whereas in the preceding figures wedge 30 slants away from buttress 36.

Figure 9:
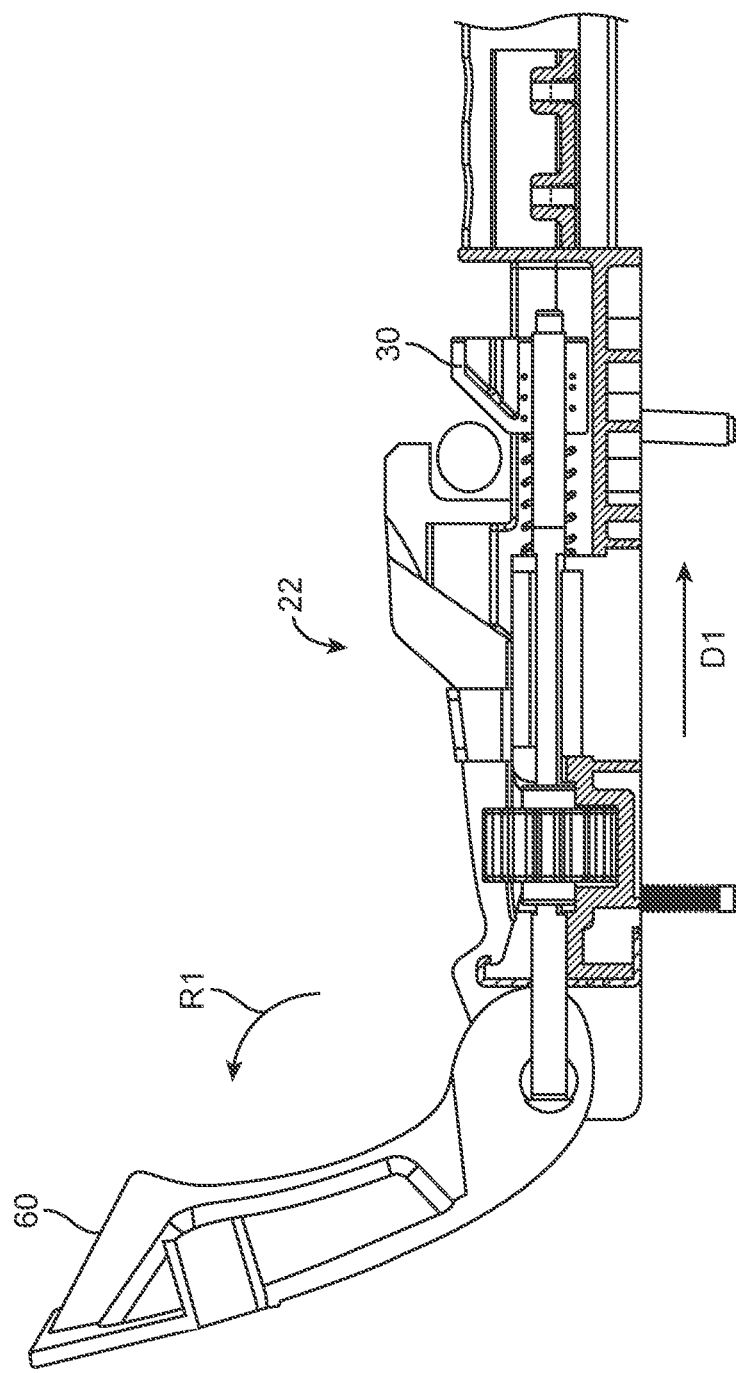
FIG. 9 illustrates a side view of another embodiment of an anchor with a movable wedge positioned in a receiving configuration.

FIG. 9 illustrates that anchor 20 can be configured such that a rotation of lever 60 (in direction R1) away from anchor body 22 can impart movement of the actuator 46 and wedge 30 in direction D1, away from the securing configuration 34.

Figure 10:
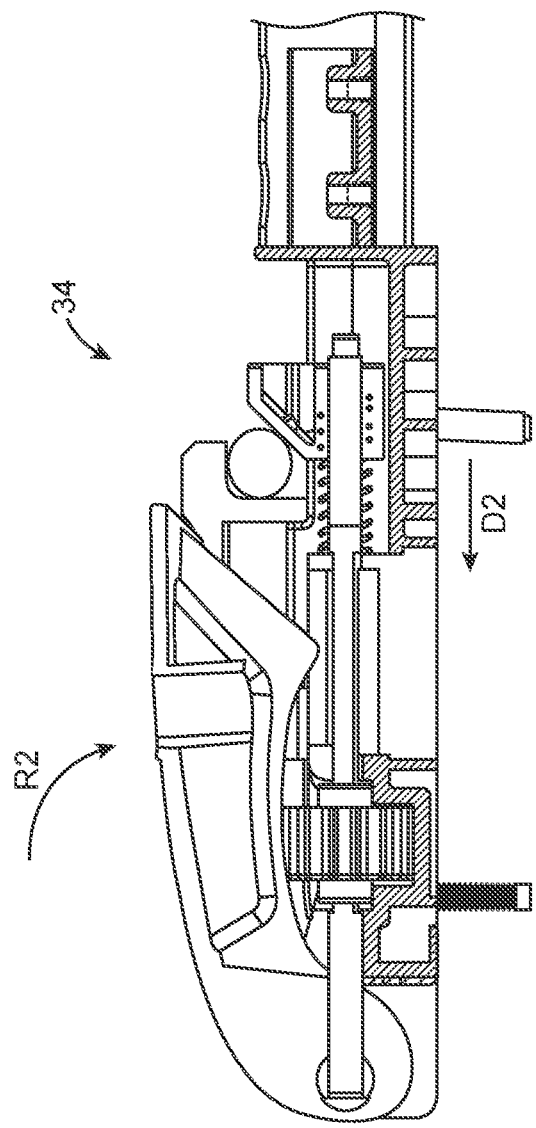
FIG. 10 illustrates a side view of another embodiment of an anchor with a movable wedge positioned in a securing configuration.

FIG. 10 illustrates that anchor 20 can be configured such that a rotation of 60 (in direction R2) towards anchor body 22 can impart movement of the actuator 46 and wedge 30 in direction D2, away from the securing configuration 34.

In order to avoid unauthorized disengagement of a securing bicycle 10 from the anchor 20, a lock 80 (shown in FIG. 6) can be provided that retains the movable wedge 30 in the securing configuration 34 until the lock 80 is unlocked for authorized release of the bicycle through-axle 14 and dismount of the bicycle 10 from the incorporating load carrier 16. In at least one embodiment, the lock 80 releasably secures lever 60 over the through-axle receiving space 24 in the fully actuated configuration of lever 60, and/or over wedge 30 in the securing configuration 34, (see for example FIG. 7).

Another exemplary configuration of the anchor 20 can be described relative to the figures in which the anchor 20 is depicted in an installed configuration and orientation on a vehicular load carrier. It is in this installed configuration of the anchor 20 that relative orientations, such as horizontal, vertical and inclined are specified.

Referring to the figures, the anchor 20 is shown for releasably securing a bicycle through-axle 14 that is installed in a wheelless front fork 12 of a bicycle 10 to a load carrier 16. The anchor 20 comprises an anchor body 22 to which a buttress 36 is stationarily coupled. A movable wedge 30 is also coupled to the anchor body 22 for movement relative to the buttress 36. Each of the buttress 36 and the movable wedge 30 have a through-axle abutment surface that are each at least partially opposingly oriented one to the other, and the abutment surface of the movable wedge 30 inclines away from the buttress 36. A receiving space 24 is defined between the abutment surfaces of the buttress 36 and the movable wedge 30 and the buttress 36 includes an overhang 37 having at least a portion of the buttress' abutment surface. The overhang 37 of the buttress projects above the receiving space 24.

In one example, the horizontal projection distance of the overhang 37 of the buttress 36 above the receiving space 24 is less than a horizontal extension component 31 of the inclined surface of the wedge 30.

In another example, the horizontal projection distance of the overhang 37 of the buttress 36 above the receiving space 24 is greater than a horizontal extension component 31 of the inclined surface of the wedge 30.

In still another example, the horizontal projection distance of the overhang 37 of the buttress 36 above the receiving space 24 is equal to a horizontal extension component 31 of the inclined surface of the wedge 30.

As shown, the overhang 37 of the buttress 36 can extend above at least one half of the receiving space 24 in a securing configuration 34 of the anchor 20. As depicted in FIGS. 1, 5, and 7-8, the movable wedge 30 and the buttress 36 are in abutting engagement with a bicycle through-axle 14 received within the interior 26 of the receiving space 24 in the securing configuration 34 of the anchor 20.

Exemplarily, the movable wedge 30 and the buttress 36 are located at least partially within the anchor body 22 and are transitionable between a receiving configuration 32 in which an interior 26 of the receiving space 24 is expanded for receiving a bicycle through-axle 14 therein and the securing configuration 34 in which the movable wedge 30 is in abutting engagement with a bicycle through-axle 14 received within the interior 26 of the receiving space 24.

In one example, the overhang 37 of the buttress 36 extends toward the wedge 30 across at least one half the distance therebetween in a securing configuration 34 of the anchor 20.

In another example, an angle of incline of the abutment surface of the buttress 36, relative to horizontal, is acute. As shown, the angle of incline of the abutment surface of the buttress 36, relative to horizontal, is approximately forty-five degrees.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. An anchor for releasably securing a bicycle through-axle that is installed in a wheelless front fork of a bicycle to a load carrier, the anchor comprising:
    an anchor body comprising a through-axle receiving space configured to receive the bicycle through-axle therein; and
    a movable wedge located within an interior hollow of the anchor body and transitionable between a receiving configuration in which an interior of the receiving space is configured to expand for insertably receiving the bicycle through-axle therein and a securing configuration in which the movable wedge is configured to be in abutting engagement with the bicycle through-axle received within the interior of the receiving space.

2. The anchor of claim 1, wherein the movable wedge is configured to approach the bicycle through-axle received within the interior of the receiving space from a side of the through-axle, in a substantially horizontal direction, and thereby affect lateral abutting engagement of the movable wedge on the bicycle through-axle.

3. The anchor of claim 1, wherein the through-axle receiving space includes a variably configurable interior configured to receive different sized bicycle through-axles therein.

4. The anchor of claim 1, further comprising:
    a buttress positioned adjacent to the through-axle receiving space opposite the movable wedge, the buttress comprising a mating portion configured to fit about differently sized bicycle through-axles when abuttingly engaged thereagainst.

5. The anchor of claim 1, further comprising:
an actuator coupled to the movable wedge that transitions the movable wedge between the receiving and securing configurations, wherein the through-axle receiving space is configured to laterally bind the bicycle through-axle inserted therein when the movable wedge is in the securing configuration.

6. The anchor of claim 5, wherein the actuator comprises:
an adjuster located within the anchor body and configured to be variably adjustable for controlling a press-force exerted on the bicycle through-axle in the securing configuration.

7. The anchor of claim 6, wherein the adjuster is a threaded turnbuckle rotatably attached to the actuator.

8. The anchor of claim 1, further comprising:
a buttress located within the anchor body and positioned adjacent to the through-axle receiving space opposite the movable wedge, the buttress comprising a mating portion configured to fit about differently sized bicycle through-axles when abuttingly engaged thereagainst; and
a lever coupled to the movable wedge and configured to translate the movable wedge between the receiving and securing configurations,
wherein the lever comprises a cam surface configured to urge the movable wedge into the securing configuration when the lever is pivoted toward the movable wedge from a substantially orthogonal position with respect to the anchor body, and
wherein the anchor body comprises a cam receiving surface configured to urge the movable wedge into the securing configuration when the lever is pivoted toward the movable wedge from a substantially orthogonal position with respect to the anchor body, and wherein a majority portion of the anchor body located between the cam receiving surface and the buttress is under compression when the movable wedge is in the securing configuration.

9. The anchor of claim 1, wherein a bicycle through-axle engagement profile on the movable wedge has a slanted surface facing a buttress configured to abuttingly engage differently sized bicycle through-axles.

10. The anchor of claim 4, wherein the buttress comprises an overhanging portion located at least partially above the receiving space configured to abuttingly engage differently sized bicycle through-axles.

11. The anchor of claim 8, wherein the actuator comprises an extension rod coupled between the lever and movable wedge and which is under tension when the movable wedge is in the securing configuration.

12. The anchor of claim 11, wherein the extension rod is threadedly engaged to the movable wedge and wherein a relative orientation of the extension rod to the movable wedge is selectively settable by rotation of the extension rod relative the movable wedge.

13. An anchor, in an installed orientation, for releasably securing a bicycle through-axle that is installed in a wheelless front fork of a bicycle to a load carrier, the anchor comprising:
an anchor body comprising a buttress;
a movable wedge coupled to the anchor body for movement relative to the buttress, each of the buttress and the movable wedge having a through-axle abutment surface, wherein the abutment surfaces are at least partially opposingly oriented one to the other; and
a receiving space defined between the buttress and the movable wedge,
wherein the buttress comprises an overhang that includes at least a portion of the buttress abutment surface, the overhang of the buttress projecting above the receiving space, and
wherein the movable wedge is configured to linearly translate.

14. The anchor of claim 13, wherein the overhang of the buttress extends above at least one half of the receiving space in a securing configuration of the anchor.

15. The anchor of claim 14, wherein the movable wedge and the buttress are configured to be in abutting engagement with the bicycle through-axle received within the interior of the receiving space in the securing configuration of the anchor.

16. The anchor of claim 14, wherein the movable wedge and the buttress are located at least partially within the anchor body and transitionable between a receiving configuration in which an interior of the receiving space is configured to expand for receiving the bicycle through-axle therein and the securing configuration in which the movable wedge is configured to be in abutting engagement with the bicycle through-axle received within the interior of the receiving space.

17. The anchor of claim 13, wherein a horizontal projection distance of the overhang of the buttress above the receiving space is less than a horizontal extension component of the inclined surface of the wedge.

18. The anchor of claim 13, wherein a horizontal projection distance of the overhang of the buttress above the receiving space is greater than a horizontal extension component of the inclined surface of the wedge.

19. The anchor of claim 13, wherein an angle of incline of the abutment surface of the buttress, relative to horizontal, is acute.

20. The anchor of claim 19, wherein the angle of incline of the abutment surface of the buttress, relative to horizontal, is approximately forty-five degrees.

21. The anchor of claim 13, wherein the abutment surface of the movable wedge inclines away from the buttress.

* * * * *